Figure 1:
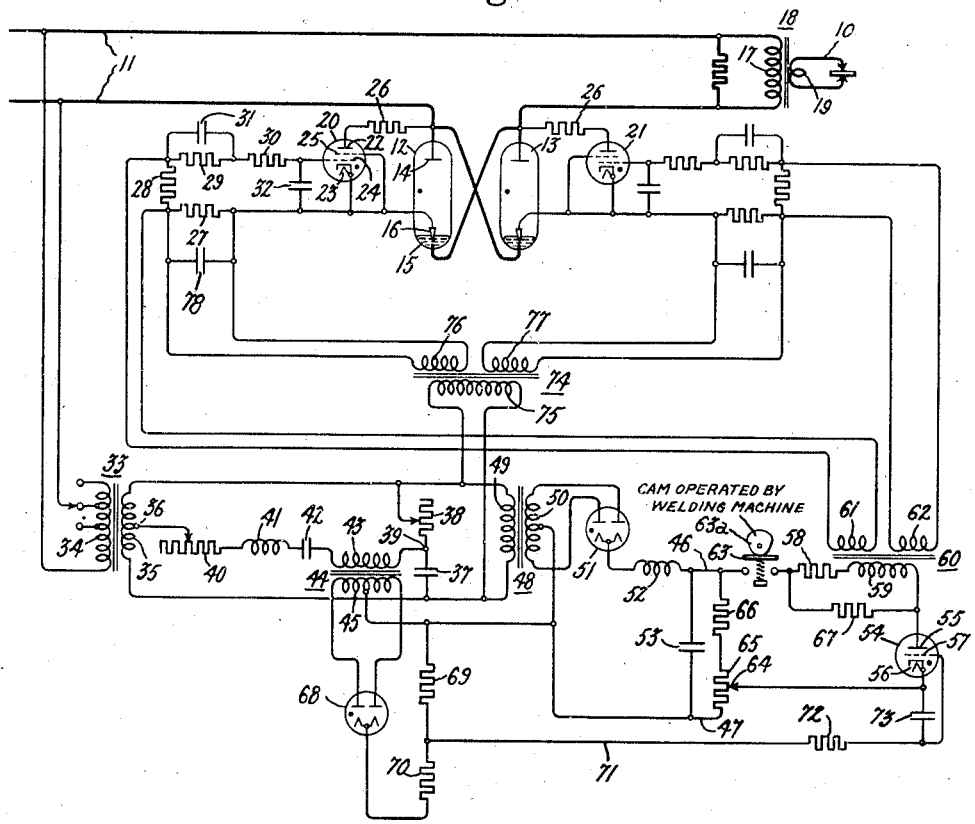

Oct. 24, 1944.	M. E. BIVENS	2,361,169
ELECTRIC VALVE CIRCUIT
Filed June 29, 1942

MMF'S OF WINDINGS
17a AND 17b ARE
IN SAME DIRECTION

Inventor:
Maurice E. Bivens,
by Harry E. Dunham
His Attorney.

Patented Oct. 24, 1944

2,361,169

UNITED STATES PATENT OFFICE 2,361,169

ELECTRIC VALVE CIRCUIT

Maurice E. Bivens, Schenectady, N. Y., assignor to General Electric Company, a corporation of New York Application June 29, 1942, Serial No. 449,022

8 Claims. (Cl. 171—119)

My invention relates to electric valve circuits, and more particularly to electric circuits which transmit impulses of current of predetermined duration to a load circuit.

In many industrial applications, such as electric resistance welding, electric valve means have been employed to effect transmission of accurately timed impulses of current in succession. In some applications the length of each current impulse is short and in these cases the speed at which the succeeding impulses can be transmitted determines the output of the equipment. In accordance with the teachings of my invention, I provide a new and improved electric valve control system capable of transmitting accurately timed impulses of current to a load circuit in rapid succession.

It is an object of my invention to provide a new and improved electric control system.

It is another object of my invention to provide a new and improved electric valve control system wherein accurately determinable amounts of current, such as an impulse of current of predetermined magnitude, are transmitted to a load circuit, such as a welding circuit in rapid succession.

Briefly stated, in accordance with the illustrated embodiment of my invention I provide reversely connected electric valve means connected between an alternating current supply circuit and a load circuit such as the transformer of a resistance welding circuit. The electric valve means are controlled in an improved manner to permit the transmission of accurately timed impulses of current to the welding transformer in very rapid succession. More particularly, the electric valves are controlled so that in response to closure of a weld initiating switch current flows for only a half cycle of the supply voltage or a predetermined portion thereof. The control circuit is arranged so that it is immediately ready to function to effect another period of energization of the load circuit upon opening and reclosing of the weld initiating switch. In other words, the control circuit is not operated on an energy storage basis and for this reason does not require time to return to a proper condition for a succeeding weld initiating operation. The time in the anode-cathode voltage wave of the electric valves that conduction is initiated is determined by the phase relation of a control voltage peak which is rectified to render an auxiliary or control electric valve conducting. The auxiliary valve is energized from a direct current source and provides means for impressing suddenly a direct current voltage on the primary of a transformer, the secondaries of which are connected to impress positive voltages of peaked wave form on the control members controlling the conductivity of the main electric valves. Only one positive impulse is impressed on the control members which control the conductivity of the main electric valves regardless of the period during which the control switch is held closed. The impulses are both of the same polarity so that whichever main electric valve is disposed to conduct for the particular half cycle conducts current.

For a better understanding of my invention reference may be had to the following description taken in connection with the accompanying drawing and its scope will be pointed out in the appended claims. In the drawing Fig. 1 represents an embodiment of my invention applied to a half cycle electric resistance welding system employing electric discharge apparatus, and Fig. 2 is a schematic representation of a modification.

Figure 2:
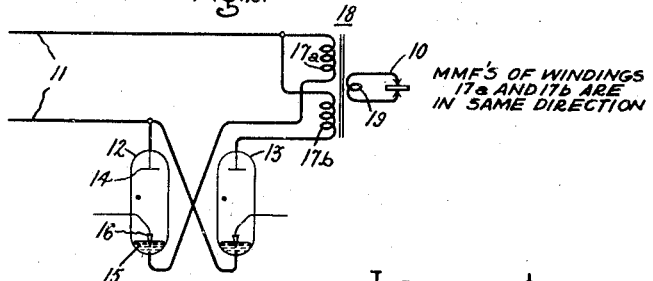

Referring now to Fig. 1 of the drawing, my invention is there diagrammatically illustrated as applied to electric translating apparatus for energizing a load circuit, such as a resistance welding circuit 10, from an alternating current supply circuit 11. The translating apparatus also may include electric valves 12 and 13 which are preferably of the type employing an ionizable medium and each comprises an anode 14, a cathode 15 of conducting liquid such as mercury, and an immersion igniter type control member 16. The electric valves 12 and 13 are reversely connected between the alternating current supply circuit 11 and the primary winding 17 of a welding transformer 18 having the secondary winding 19 thereof connected to energize the resistance welding circuit 10.

The immersion igniter control members 16 are of material having a high electrical resistivity compared with that of the associated mercury pool cathode and require the transmission of a predetermined minimum amount of current therethrough in order to initiate an arc discharge between the anode and the cathode. In order to control the flow of current through the immersion igniter control member auxiliary or firing valves are associated with the main electric valves 12 and 13, respectively. Each of the valves 20 and 21 are preferably of the type employing an ionizable medium and each comprises an anode 22, a cathode 23, a control member or grid 24 and a second control member or shield grid 25. The anode-cathode circuit of valves 20 and 21 are connected in parallel with the anode 14 and control member 16 of the main electric valves 12 and 13, respectively, through suitable current limiting resistors 26. This connection provides for what is termed anode firing of the main electric valves, inasmuch as the impulse of current through the igniter is derived in accordance with the anode potentials of the main electric valves and under the control of the control members 24 of the auxiliary electric valves. Since the circuit for energizing the control members 24 of the firing valves 20 and 21 are identical, only one will be described. The cathode-to-control-member circuit of each of the valves 20 and 21 includes in series resistors 27, 28, 29 and 30. Resistor 29 and a capacitor 31 connected in parallel therewith provides a self-biasing circuit and resistor 30 is a current limiting resistor. Resistors 27 and 28 provide impedance elements across which are impressed control voltages for effecting the transmission of current to the welding circuit in the desired manner. The shield grid 25 is connected directly to the cathode 23 and a filter capacitor 32 is connected between the cathode and the control member or grid 24 to eliminate the effect of transients on the action of the control member.

The control circuit for effecting the energization of resistors 27 and 28 to effect the desired energization of the welding circuit will now be described. A transformer 33 having a tapped primary winding 34 energized from the alternating current circuit 11 provides a source of alternating current control voltage. The secondary winding 35 of transformer 33 is provided with a midtap 36 which forms one of the output terminals of a phase shifting circuit which includes, in addition to the winding 35, a capacitor 37 and an adjustable resistor 38 connected across the end terminals of the transformer winding 35. The common terminal 39 of the capacitor 37 and resistor 38 provides the other output terminal of the phase shifting circuit. Connected between the output terminals 36 and 39 of the phase shifting circuit is a series circuit including an adjustable resistor 40, an inductance 41, capacitance 42, primary winding 43 of a peaking transformer 44 having a midtapped secondary winding 45. The inductance 41 and capacitance 42 form a filter for the primary circuit of the peaking transformer 44 and the adjustable resistor 40 provides means for adjusting the phase of the peaked voltage produced by the peaking transformer. This circuit is often referred to as a resistance peaking transformer circuit. The particular circuit utilized for obtaining voltage peaks including the filter is described and claimed in Patent 2,246,177, Le Voy, Jr., dated June 17, 1941, and assigned to the same assignee as the present invention.

For the purposes of the present invention the control circuit thus far described, including the peaking transformer, provides means for producing voltages of peaked wave form every half cycle of the alternating current supply voltage of the circuit 11 and having a phase relation with respect thereto which depends upon the adjustment of the resistor 38 and the resistor 40. In accordance with the present invention this peaked voltage is converted to a control voltage which occurs at a time in the anode-cathode voltage of the main electric valves determined by the peaked voltages of the winding 45 but which occurs only once for each closure of a controlling switch, such as a weld initiating switch. A supply of direct current control voltage is provided by the conductors 46 and 47 which are energized by the output of a full wave rectifier comprising a transformer 48 having the primary winding 49 thereof energized from the secondary winding 35 of transformer 33 and a midtapped secondary winding 50, an electric discharge device 51 having a pair of unilaterally conducting paths is interposed between the winding 50 and conductors 46 and 47, in a manner well understood, to convert the alternating current voltage of the winding 50 to a direct current voltage. A series inductive reactor 52 and a shunt capacitor 53 provide means for filtering the direct current voltage output of the rectifier circuit. An auxiliary or control electric valve 54, which is also preferably of the type utilizing an ionizable medium, comprises an anode 55, a cathode 56 and a control member or grid 57. The anode-cathode circuit of the electric valve 54 is connected in series with a current limiting resistor 58 and the primary winding 59 of a peaking transformer 60 having secondary windings 61 and 62. This series circuit is connected to be energized from a portion of the voltage between conductors 46 and 47 under the control of a circuit controlling means 63 which may be operated periodically either manually or as illustrated, by means of cam 63a driven from the operating mechanism for the electrodes of the welding machine (not shown). The portion of the voltage of conductors 46 and 47 which is impressed on the series circuit including the anode-cathode circuit of the electric valve 54 is determined by the position of a movable tap 64 on voltage dividing resistors 65 and 66 which are connected across the conductors 46 and 47. A voltage limiting resistor 67 is connected in shunt with the transformer primary winding 59 and resistor 58.

In order to control the conductivity of the electric valve 54 in accordance with the voltage peaks produced in the winding 45 of peaking transformer 42 I provide means for introducing a control voltage in the form of a positive bias in the cathode-to-control-member circuit of the electric valve 54 produced by rectifying the voltage peaks of the winding 45. To this end an electric discharge valve 68 having two unilaterally conducting paths connected with the midtapped transformer winding 45 to provide a full wave rectifier circuit, the output of which is impressed across voltage dividing resistors 69 and 70. This rectified voltage may be considered a double frequency voltage of peaked wave form. The terminal of resistor 69 forming the negative terminal of the direct current circuit energized by the transformer 45 and cooperating electric discharge valve 68 is connected with the conductor 47. A conductor 71 connects the common terminal of resistors 69 and 70 to the control member 57 through a suitable current limiting resistor 72. A suitable filtering capacitor 73 is connected between control member 57 and the cathode 56. From an inspection of the drawing it will be seen that the cathode-to-control-member circuit of the electric valve 54 includes the portion of the voltage dividing resistor 65 included between the tap 64 and the negative conductor of the direct current control voltage supply 47 and the resistor 69, the former providing a negative or holdoff bias and the latter providing a bias for rendering electric valve 54 conductive when a voltage peak of transformer winding 25 is rectified by the discharge device 58.

The secondary windings 61 and 62 of the transformer 60 are connected across the resistors 28 in the cathode-to-control-member circuits of the electric valves 20 and 21, respectively, to impress thereon a peaked voltage when electric valve 54 is rendered conductive and a transient current flows through winding 59 of the transformer 60. The windings 61 and 62 are so connected that the voltages thereof tend to render electric valves 20 and 21 conductive simultaneously. In order to maintain the electric valves 20 and 21 nonconductive except when the turn on voltage is impressed on the resistors 28 an alternating current holdoff voltage is impressed across the resistors 27. As illustrated in the drawing, this means comprises a transformer 74 having a primary winding 75 energized from the alternating current circuit 11 by means of the transformer secondary winding 35. The transformer 74 comprises secondary windings 76 and 77 which are connected across the resistors 27 associated with the cathode-to-control-member circuits of electric valves 20 and 21, respectively. Capacitors 78 are connected across resistors 27 to suppress undesirable transients in the control circuit. The alternating current voltages impressed on the resistors 27 are substantially in phase opposition with the anode-cathode voltages of the electric valves 12 and 13, respectively, so that these voltages provide alternating current holdoff voltages tending to maintain the electric valves 20 and 21, and consequently the valves 12 and 13, nonconductive.

If desired, a voltage limiting means such as a resistor 77 may be connected across the primary windings 17 of the welding transformer 18 to provide for the dissipation of stored electro-magnetic energy of the transformer core when the circuit is interrupted by the electric valve means 12 and 13.

The operation of the embodiment of my invention illustrated in Fig. 1 will be explained by considering the system arranged to operate as a half cycle welder, that is, when it is intended to transmit a half cycle or a predetermined portion of a half cycle of current to the welding circuit 10 in response to each closure of the circuit controlling means 63. For the sake of simplicity the heater circuits for the heated filaments of the electric valves has not been shown. In the discussion of the operation it is assumed that the tubes are all at proper operating temperature. With switch 63 in open circuit position the electric valves 20 and 21, and as a result the electric valves 12 and 13, are maintained nonconductive by the alternating current holdoff voltage impressed across resistors 27 and the self-biasing circuits including resistors 29 and capacitors 31. Also with switch 63 in the open circuit position a voltage appears across resistor 69 during each half cycle of supply circuit voltage for a short interval. This voltage is the rectified output of the peaking transformer 44 which produces a peak at an instant in each half cycle of voltage of the alternating current circuit 11 dependent upon the setting of the variable resistors 38 and 40. Resistor 38 serves to determine the phase relation of the voltage across the output terminals 36 and 39 of the phase shifting circuit with respect to the supply circuit 11 and the adjustment of resistor 40 serves to adjust the phase relation of the voltage peaks produced by transformer 44 with respect to the voltage between the output terminals 36 and 39 of the phase shifting circuit. It will be more apparent as the description proceeds that both of these resistors provide means for controlling the portion of the half cycle during which current is transmitted to the load circuit and in this way provide a heat control for the welding system. If the welding switch 63 is now closed a direct current voltage is impressed on the anode-cathode circuit of the electric discharge valve 54. The valve 54 is maintained nonconductive by the bias voltage appearing across the portion of resistor 65 included between tap 64 and the conductor 47 until such time as the next voltage peak is induced in winding 45, when the rectified peak appears across resistor 69 as a positive bias to render electric discharge valve 54 conductive. The initiation of conduction in valve 54 causes a transient current to flow through the primary winding 59 of the transformer 60 and induces a peaked voltage in the transformer windings 61 and 62. As previously mentioned, both windings 61 and 62 are connected with resistors 28 with such a polarity that the initiation of a transient flow of current in the winding 59 due to conduction of valve 54 produces a voltage across impedances 28 tending to render electric valves 20 and 21 conductive. The voltage across impedance 28 is of sufficient magnitude to overcome the holdoff voltages and render one of the valves 20 or 21 conductive depending upon which anode is positive at the particular instant. Since the transformer 60 is energized by the transient flow of current only one peak of each polarity is produced for a period of conduction of electric valve 54. The resistor 58 in series with the anode-cathode circuit of the valve 54 limits the steady state current conducted by the valve and the resistor 67 connected in parallel with transformer winding 59 and resistor 58 provides a path for current to flow when electric valve 54 ceases conducting due to interruption of the circuit by circuit controlling means 63. This path permits the gradual dissipation of stored energy of transformer 60 and in this way to limit the negative voltage peaks produced across resistor 28.

From the foregoing description it is seen that the closure of switch 63 effects conduction of either valve 12 or 13 for a predetermined portion of a half cycle of the alternating current supply voltage dependent upon the instant that the voltage peaks are produced in the winding 45. It will also be noted that the impulse of current impressed on the load circuit occurs at the instant the anode-cathode voltage of one of the electric valves 12 or 13 reaches the magnitude determined by the phase relation of the voltage peaks produced in winding 45 regardless of the polarity of these voltages. Thus the utilization of the reversely connected valves for the half cycle welder with the control provided by the present invention effects energization of the load in synchronous relation with respect to the instantaneous magnitude of the supply voltage but at random with respect to the polarity of the alternating current supply voltage. It will also be noted that the control circuit for rendering the electric valves 12 and 13 conductive does not depend upon energy storage and for this reason may be operated at very high speed and is effective to produce a current impulse in the welding circuit each time switch 63 is closed.

From the foregoing description it will be apparent that when the system of Fig. 1 is utilized as a half wave welder with the impulse supplied to a load circuit at random with respect to the polarity of the half cycles of voltage of the alternating current supply circuit, the effect of the residual magnetism of the transformer may not be uniform for all of the impulses. In Fig. 2 is shown a modification of my invention in which the power circuit is arranged so that regardless of the polarity of the half cycles of the supply circuit during which a current impulse is supplied to the load circuit the magnetization of the welding transformer is always in the same direction. The control circuit has been omitted from Fig. 2 but it will be understood that the same control as described in detail in connection with Fig. 1 may be used.

Referring now to Fig. 2 the welding transformer 18 is provided with two sections, 17a and 17b. The electric valve means 12 and 13 are reversely connected with respect to the alternating current supply circuit 11 but are connected with respect to sections 17a and 17b so that each valve supplies current to a different section. The sections are arranged on the core of the transformer 18 so that current supplied to the load during either half wave of voltage of the supply circuit produces magnetomotive force in the same direction in the core structure of the transformer. From an inspection of the drawing it is apparent that an impulse of current conducted by valve 12 is supplied to the winding section 17a and by the valve means 13 to the winding section 17b. The operation of the control system is the same as that described above. It will be apparent that with this arrangement the number of impulses supplied to the load circuit during positive half cycles of supply voltage may vary widely from the number of impulses supplied to the load circuit during negative half cycles of the supply circuit voltage without affecting in any way the uniformity of the current impulses supplied to the welding load circuit. This contributes to uniformity in the welds produced.

While I have described what I at present consider preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. In combination, an alternating current supply circuit, a load circuit, a pair of electric valve mean interconnecting said circuits and disposed to supply current impulses to said load circuit during half cycles of voltage of opposite polarity of said supply circuit, a control member associated with each of said electric valve means, switching means, means for effecting successive circuit closing operations of said switching means at random with respect to the voltage of said alternating current supply circuit, means operated in response to each circuit closing operation of said switching means to energize said control members to effect conduction of only that one of said electric valve means whose anode voltage first reaches a predetermined positive value after circuit closing operation of said switching means, and means for controlling said last mentioned mean to establish said predetermined value.

2. In combination, an alternating current supply circuit, a load circuit, a pair of electric valve means interconnecting said circuits and disposed to supply current impulses to said load circuit during half cycles of voltage of either polarity of said supply current, a control electrode associated with each of said electric valve means, means for impressing on said control electrodes a hold-off voltage, means for modifying the effect of said hold-off voltage including circuit controlling means, means for effecting successive operations of said circuit controlling means at random with respect to the voltage of said alternating current supply circuit, and means for synchronizing the operation of said means for modifying said hold-off voltage with the alternating current supply circuit voltage to effect the conduction of only that one of said electric valve means whose anode first reaches a predetermind positive value of voltage after each operation of said circuit controlling means.

3. In combination, an alternating current supply circuit, a load circuit including a pair of electric valve means interconnecting said circuits and oppositely disposed with respect to said supply circuit to transmit current impulses to said load circuit during half cycles of voltage of either polarity of said supply circuit, a control member associated with each of said electric valve means, means for impressing on said control members a hold-off voltage, switching means, means for effecting successive circuit closing operations of said switching means, means operated in response to operation of said switching means to modify said hold-off voltage to effect conduction of only that one of said electric valve means whose anode first reaches a predetermined positive voltage after each circuit closing opration of said switching means, and means including a source of double frequency voltage having adjustable phase relation with respect to the voltage of said alternating current supply circuit for establishing said predetermined value.

4. In combination, an alternating current supply circuit, a load circuit including a pair of electric valve means interconnecting said circuits and oppositely disposed with respect to said supply circuit to transmit current impulses to said load circuit during half cycles of voltage of either polarity of said supply circuit, a control member associated with each of said electric valve means, means for impressing on said control members a hold-off voltage, means for modifying said hold-off voltage comprising a source of control voltage, an auxiliary electric valve and switching means, means for effecting successive circuit closing operation of said switching means to effect successive energizations of said auxiliary electric valve from said source of control voltage, means for rendering said auxiliary electric valve conductive at the first instant after each closure of said switching means that the voltage of said supply circuit reaches a predetermined magnitude irrespective of polarity, and means responsive to the conduction of said auxiliary electric valve for rendering only one of said electric valve means conducting.

5. In combination, an alternating current supply circuit, a load circuit, a pair of electric valve means interconnecting said circuits and oppositely disposed with respect to said supply circuit to transmit current impulses to said load circuit during half cycles of voltage of either polarity of said supply circuit, each of said electric valve means including a control electrode, a control circuit for energizing said control electrodes comprising a source of control voltage, an auxiliary electric valve including an anode and a cathode and switching means, means connecting said source of control voltage and the anode-cathode circuit of said valve with said switching means in series circuit relation, means for operating said switching means to effect successive circuit closing operation thereof at random with respect to the voltage of said alternating current supply circuit, and means for rendering said auxiliary electric valve conductive the first instant after each closure of said switching means that the voltage of said supply circuit reaches a predetermined magnitude irrespective of the polarity of said voltage to render only one of said valve means conductive for each closure of said switching means.

6. In combination, an alternating current supply circuit, a load circuit, electric translating apparatus interconnecting said circuits including electric valve means having a control member, means for impressing an alternating current holdoff voltage on said control member to maintain said valve means nonconductive, a transformer having a secondary winding connected to impress a voltage on said control member to overcome said holdoff voltage, and a primary winding, a source of direct current voltage, an auxiliary electric valve having an anode, a cathode and a control member, mechanical switching means, means connecting said source of direct current voltage, the anode-cathode circuit of said auxiliary valve and said mechanical switching means in series circuit relation with the primary winding of said transformer, means for effecting circuit closing operation of said switching means periodically, and means including a source of voltage having an adjustable phase relation with respect to said alternating current supply circuit for rendering said auxiliary valve conductive at a predetermined instant in the voltage wave of the alternating current supply circuit to produce a single transient current flow in the primary winding of said transformer for each closure of said mechanical switching means and thereby produce a voltage peak in the secondary winding thereof to render said electric valve means conductive at said predetermined point in the supply circuit voltage.

7. In combination, an alternating current supply circuit, a load circuit including a transformer having a pair of winding sections, a pair of electric valves interconnecting said supply and said load circuit and disposed to supply current to a different one of said winding sections during half cycles of opposite polarity of said supply circuit, a control member associated with each of said valve means for controlling the initiation of conduction therein, and a control circuit for controlling energization of said control members to effect periodic conduction of one or the other of said valves at random for a predetermined portion of a half cycle of said supply circuit voltage, the connections between said valves and said winding sections being such that current conducted by either of said valves produces a flux in said transformer in the same direction so that the operation of said translating apparatus is uniform regardless of inequalities in the number of impulses supplied by each of said valves.

8. In combination, an alternating current supply circuit, a load circuit including a transformer, a pair of electric valves interconnecting said transformer and said supply circuit and disposed to conduct current during half cycles of voltage of opposite polarity of said supply circuit and to produce a flux in the core of said transformer in the same direction regardless of the polarity of the half cycle of said supply circuit during which one of the valves is conducting, a control member associated with each of said valves for controlling initiation of conduction therein, and a control circuit for controlling the energization of said control members to effect conduction of either of said valves for a predetermined portion of a half cycle of said supply circuit voltage to supply current impulses to said load circuit, and means for synchronizing the operation of said last mentioned means with said alternating current supply circuit voltage to determine the time in a half cycle but not the polarity of the half cycle during which current impulses are supplied to said load circuit.

MAURICE E. BIVENS.